US012674933B2

(12) United States Patent
Frish et al.

(10) Patent No.: US 12,674,933 B2
(45) Date of Patent: Jul. 7, 2026

(54) LOW-LOSS WAVEGUIDE WITH UNDERCUT

(71) Applicant: Intel Corporation, Santa Clara, CA (US)

(72) Inventors: Harel Frish, Albuquerque, NM (US); John M. Heck, Berkeley, CA (US); Duanni Huang, San Jose, CA (US); Hari Mahalingam, San Jose, CA (US); Haisheng Rong, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 355 days.

(21) Appl. No.: 17/561,683

(22) Filed: Dec. 23, 2021

(65) Prior Publication Data

US 2022/0120967 A1 Apr. 21, 2022

(51) Int. Cl.
G02B 6/12 (2006.01)
G02B 6/136 (2006.01)

(52) U.S. Cl.
CPC ......... G02B 6/12007 (2013.01); G02B 6/136 (2013.01)

(58) Field of Classification Search
CPC ........ G02B 6/12; G02B 6/12007; G02B 6/13; G02B 6/136
See application file for complete search history.

(56) References Cited

U.S. PATENT DOCUMENTS

| | | | | |
|---|---|---|---|---|
| 5,046,809 | A * | 9/1991 | Stein | G02B 6/2551 385/95 |
| 5,390,271 | A * | 2/1995 | Priest | G02B 6/4204 385/36 |
| 6,081,638 | A * | 6/2000 | Zhou | G02B 6/4214 372/50.1 |
| 6,788,853 | B2 * | 9/2004 | Steinberg | G02B 6/122 385/49 |
| 10,416,380 | B1 * | 9/2019 | Chen | G02B 6/1228 |
| 10,718,898 | B1 * | 7/2020 | Park | G02B 6/1228 |
| 2002/0001435 | A1 * | 1/2002 | Steinberg | G02B 6/30 385/52 |
| 2009/0274418 | A1 * | 11/2009 | Holzwarth | B82Y 20/00 385/30 |
| 2009/0297108 | A1 * | 12/2009 | Ushiwata | B29D 11/00673 385/127 |
| 2015/0301282 | A1 * | 10/2015 | Natsumeda | H10K 50/16 257/40 |
| 2020/0286747 | A1 * | 9/2020 | Trindade | B81C 3/008 |
| 2021/0318561 | A1 | 10/2021 | Sakib et al. | |

* cited by examiner

*Primary Examiner* — Tina Wong
(74) *Attorney, Agent, or Firm* — Alliance IP, LLC

(57) ABSTRACT

An apparatus comprising a substrate; a waveguide above the substrate; and an undercut into the substrate, the undercut beneath at least a portion of the waveguide, wherein a magnitude of a maximum length of the undercut is lower than a magnitude of a maximum depth of the undercut.

19 Claims, 7 Drawing Sheets

LOW-LOSS WAVEGUIDE WITH UNDERCUT

BACKGROUND

A device may comprise optical components for use in communication. The optical components may be included in an integrated circuit. The optical components may include a plurality of waveguides.

BRIEF DESCRIPTION OF THE DRAWINGS

Like reference numbers and designations in the various drawings indicate like elements.

DETAILED DESCRIPTION

Figure 1:
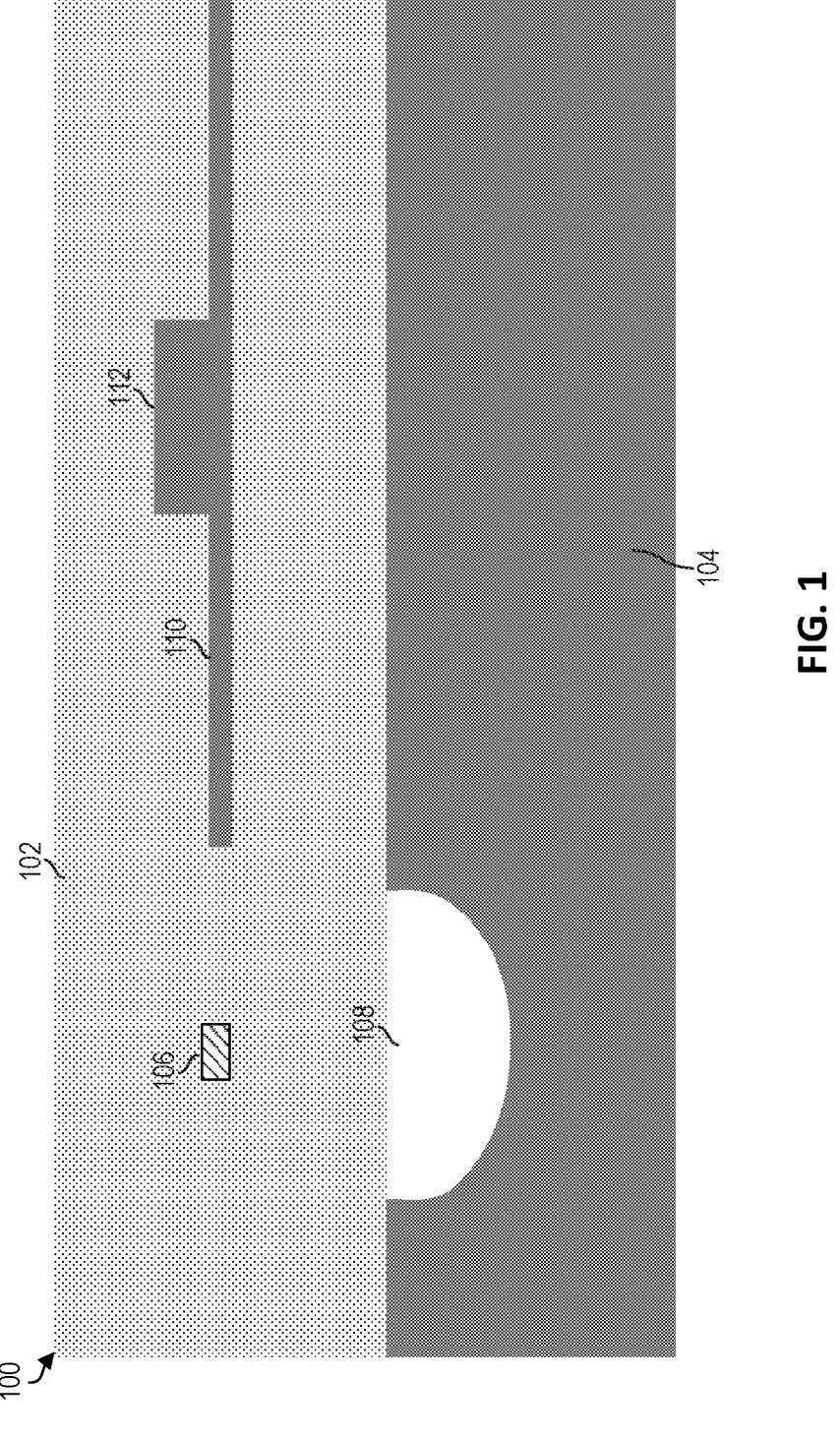
FIG. 1 illustrates a cross section view of a device comprising a low-loss waveguide over an undercut in accordance with certain embodiments.

FIG. 1 illustrates a cross section view of a device 100 comprising a low-loss waveguide 106 above an undercut 108 in accordance with certain embodiments. The device 100 also includes a substrate 104, oxide layer 102, silicon slab 110, and a second waveguide 112 formed on the silicon slab.

A waveguide (e.g., 106 or 112) may comprise a structure to guide electromagnetic waves, e.g., by restricting the transmission of energy to a particular direction. A waveguide may have any suitable shape (e.g., the cross section may be rectangular as shown, trapezoidal, etc.). The waveguide 106 may have a core material and at least a portion of the waveguide may be surrounded by a cladding material, which may be, e.g., an electrically insulating material such as an oxide (e.g., $SiO_2$), a nitride, etc.

In various embodiments, a waveguide may be used in an integrated photonics device as a low loss device for applications, such as light routing, high-Q ring resonators, and high-power applications. Waveguides may also be used in devices that require low temperature dependence such as wavelength multiplexers and demultiplexers.

When a waveguide has a high effective index (where the effective index is a function of the core material and geometry of the waveguide) relative to the material surrounding the waveguide, the leakage of electromagnetic energy from the waveguide into the surrounding material may be low. However, when the effective index is low or approaches the refractive index of the surrounding material, the leakage may reach undesirable levels. For example, when the effective index of a waveguide is relatively low and only a thin layer of oxide (e.g., silicon dioxide) separates the waveguide from the substrate (e.g., a silicon substrate), the mode of the waveguide may expand and the leakage from the waveguide into the substrate may reach undesirable levels as the light propagated to the waveguide is not confined solely to the core material.

In the embodiment depicted, waveguide 106 may be any suitable type of waveguide that could be susceptible to leakage into the substrate 104 (e.g., the waveguide 106 may have a lower effective index than the refractive index of the substrate 104). As various examples, the waveguide 106 may have a core material of silicon nitride ($Si_3N_4$), titanium oxide ($TiO_2$), Silicon oxynitride (e.g., SiON), polymers, or other material with a relatively low refractive index, or may have a core material of silicon (Si) and may have relatively small dimensions (e.g., smaller than another waveguide 112, which could be a Si waveguide that is not susceptible to substantial leakage into the substrate 104), or other suitable core material.

In order to achieve a very low loss waveguide, the core of the waveguide may be relatively small and the optical mode may expend above and below the waveguide core, which may present a challenge when the oxide layer (e.g., 102) is not sufficiently thick to prevent the optical mode from leaking into the silicon substrate (e.g., 104). For example, in one embodiment, the oxide layer 102 may be a buried oxide (BOX) layer that is, e.g., roughly 1 um thick, whereas the optical mode of the waveguide may extend past the boundary between the BOX layer and the substrate 104. In various embodiments, a BOX layer may be placed over the substrate 104 (e.g., a Si substrate) and then active circuitry (e.g., metal-oxide-semiconductor field-effect transistors (MOSFETs)) may be formed over the BOX layer (e.g., a layer of Si and/or other layers may be formed over the BOX layer to form the circuitry).

The waveguide loss into the substrate may decrease as a function of the distance from the waveguide to the substrate. For example, a $Si_3N_4$ waveguide loss may be as high as more than 9 dB/cm with a 1 um BOX, but may be reduced to ~0.2 dB/cm with a 2 um BOX in some examples. Placement of a waveguide (e.g., 106) at a distance of 2 um or more above the silicon substrate may be ideal to reduce optical leakage into the substrate. However, in some implementations, it may be advantageous to maintain the thinner oxide. For example, for a transmitter with integrated lasers, the thinner oxide may be preferred as it may offer better thermal conductivity and more efficient laser operation. In some embodiments, it may be desirable to integrate the waveguide 106 with a silicon on insulator (SOI) wafer with a thin (e.g., ~1 um) BOX layer.

In various embodiments of the present disclosure, an undercut 108 may be formed in the silicon substrate 104 to increase the distance between the waveguide 106 and the material of the substrate, thus substantially reducing the amount of leakage into the substrate 104 that would occur in the absence of the undercut 108. In some embodiments, undercutting (e.g., forming one or more undercuts 108 underneath one or more waveguides 106 may significantly reduce (or prevent) substrate leakage and achieve very low loss waveguides on a device 100 (e.g., an SOI wafer with a thin oxide layer 102 (e.g., 1 um BOX)). The undercut 108 may allow the material of the waveguide to be placed much closer to the top plane of the substrate, providing more design and process flexibility. In one embodiment, the undercut 108 may enable a single chip to include an optical transceiver including a transmitter with integrated lasers and a receiver with a $Si_3N_4$ (or other suitable waveguide core material) demultiplexer (e.g., implemented at least in part by waveguide 106) on a SOI wafer. An optical demultiplexer may receive a light signal including multiple optical frequencies and separate the light signal into its frequency components. Various embodiments allow much simpler integration of a transmitter and receiver, allowing for greater flexibility for the architecture definition and new functionalities such as waveguide crossing or other functionalities.

In various embodiments, one or more waveguides 106 with corresponding undercuts 108 may be on the same wafer as one or more waveguides 112 that do not include undercuts. In one example, waveguide 112 may be a waveguide with a higher effective index than the effective index of waveguide 106. For example, waveguide 112 may comprise a core material of silicon whereas waveguide 106 may comprise a core material of silicon nitride. Silicon has a much higher refractive index then silicon nitride, therefore the optical mode of the silicon waveguide 112 may be more tightly confined and does not leak through oxide 102 into the substrate 104. As another example, the geometries of waveguide 112 may result in a higher effective index than the geometries of waveguide 106.

Figure 2:
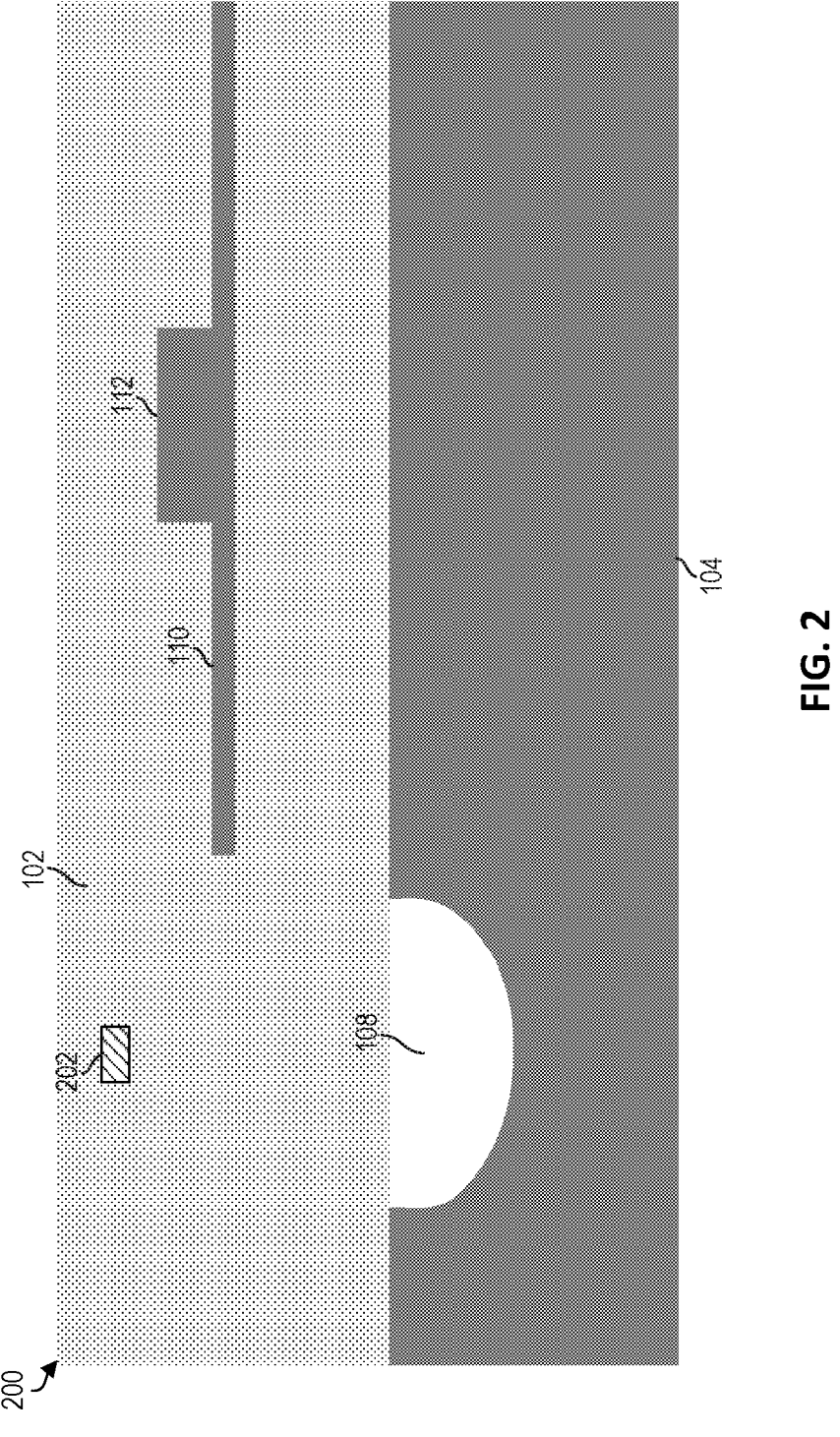
FIG. 2 illustrates a cross section view of another device comprising a low-loss waveguide over an undercut in accordance with certain embodiments.

In the embodiment depicted, the waveguide 106 is substantially on the same plane as the silicon slab 110 on which the waveguide 112 is formed (e.g., roughly 1 micron above the silicon substrate 104). In the embodiment of FIG. 2, a waveguide 202 (which may have any suitable characteristics of waveguide 106) may be placed on a higher plane (e.g., above at least a portion of the waveguide 112). In various embodiments, light may pass through waveguide 112 into waveguide 106 or 202 (thus a small gap may be present between respective waveguides).

Figure 3:
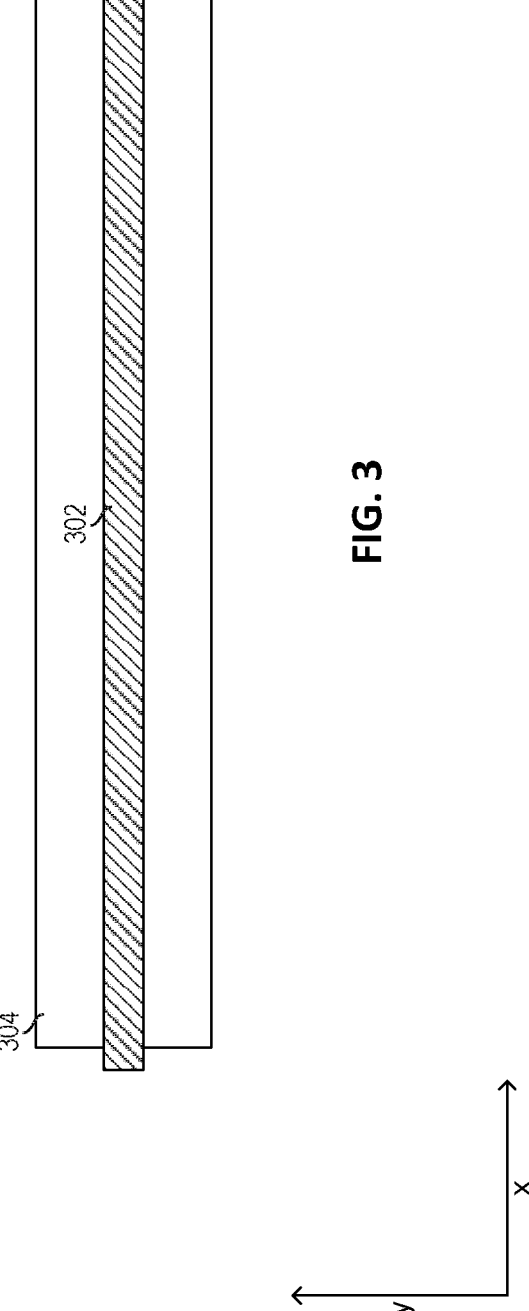
FIG. 3 illustrates a top view of a device comprising a low-loss waveguide in accordance with certain embodiments.
Figure 4A:
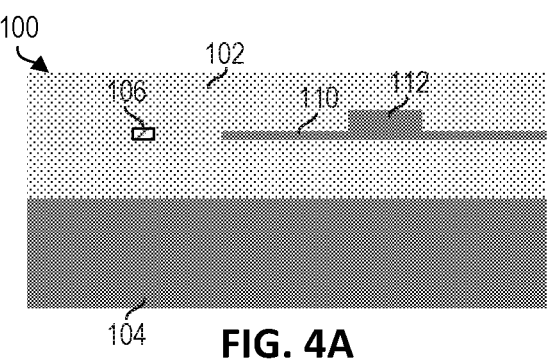
FIGS. 4A-4E illustrate phases of manufacture of a device comprising an undercut under a low-loss waveguide in accordance with certain embodiments.
Figure 4B:
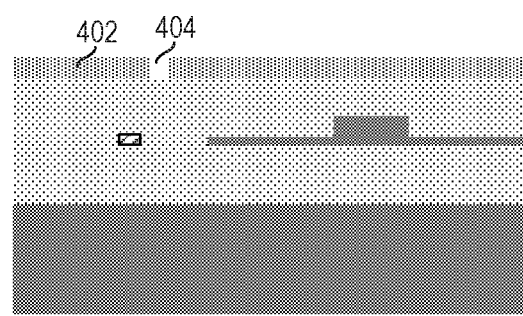
Figure 4C:
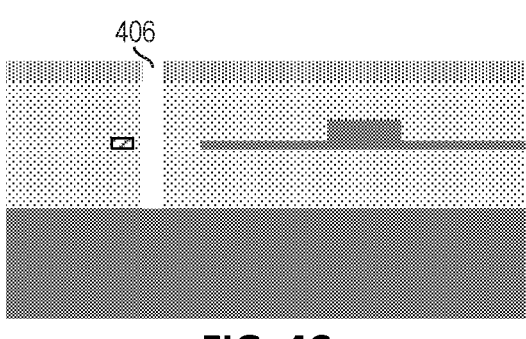
Figure 4D:
Figure 4D:
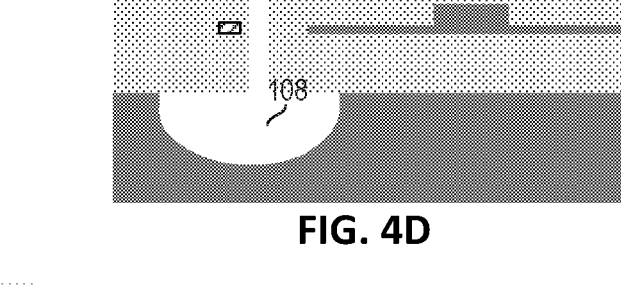
Figure 4E:
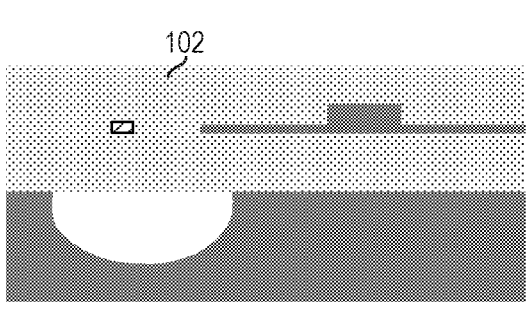

FIG. 3 illustrates a top view of a device comprising a low-loss waveguide 302 in accordance with certain embodiments. FIG. 3 also depicts the contours of an undercut 304 that is underneath the waveguide 302 (the waveguide 302 and undercut 304 may have any suitable characteristics of other waveguides or undercuts shown or described herein). The shape of the undercut 304 in the x and y directions is shown as generally rectangular, although in other embodiments, the undercut may have any suitable shape. The shape shown may represent the upper contour of the undercut 304 (the contour of the portion of the undercut 304 that is closest to the bottom of the waveguide 302 or the contour at the oxide and substrate boundary) and the shape may or may not be consistent along the depth of the undercut 304 (e.g., in FIGS. 1 and 2 the width of the undercut 304 narrows towards the bottom of the undercut 304).

In the embodiment depicted, the length of the undercut 304 is shown in the x direction and the width of the undercut 304 is shown in the y direction. The depth of the undercut 304 into the substrate is not shown in FIG. 3 (but an example depth is shown in FIGS. 1 and 2).

In the embodiment depicted, the length of the undercut 304 (shown in the x direction) is substantially the same as the length of the waveguide 302. In other embodiments, the length of the undercut 304 may be longer or shorter than the length of the waveguide 302. In various embodiments, the length of the undercut 304 may be relatively long (e.g., in some embodiments, the length of the undercut 304 may be greater than 80 um, and could even be up to a mm or cm long depending on the length of the waveguide 302 and/or the mode characteristics). In the embodiment shown in FIG. 3, the width of the undercut 304 (shown in the y direction) is wider than the width of the waveguide 302 (e.g., more than twice as wide). In various embodiments, the width of the undercut 304 is smaller than the length of the undercut (e.g., less than 50% of the length). In various embodiments, the magnitude of the depth of the undercut 304 may be relatively small (e.g., relative to the width or length of the undercut 304). For example, in some embodiments, the depth of the undercut 304 may be less than 5 um.

In various embodiments, the dimensions of the undercut 304 may be tailored based on the desired leakage, the effective index of the waveguide, the mode characteristics of the waveguide, the distance between the waveguide and the substrate, or other suitable parameters.

In some embodiments, one or more other waveguides (e.g., 112 or other waveguide not shown) of the same device may also include an undercut. For example, a smaller undercut (e.g., with a length or diameter of ~20 um) may be made underneath a silicon waveguide for a ring modulator with a heater to improve the thermal isolation of the heater. In such embodiments, process steps used to form such an undercut may also be used to form any of the undercuts described herein (e.g., 108, 304). In general, the undercut (e.g., 108) used for waveguide 106 may be longer and shallower (e.g., a few um deep or less) than an undercut used under a waveguide with a heater (which may be, e.g., greater than 10 um deep).

FIGS. 4A-4E illustrate phases of manufacture of a device 100 comprising an undercut 108 under a low-loss waveguide 106 in accordance with certain embodiments. In phase 4A, oxide layer 102 has already been formed over the substrate 104, and the waveguides 106 and 112 have been formed as well.

In phase 4B, a resist layer 402 with an aperture 404 is applied to the top of the oxide layer 102, for example, via a lithography process. In phase 4C, a trench 406 is formed through the oxide layer 102 such that the substrate 104 is exposed (e.g., by applying an etch through the aperture and down into the oxide layer 102). As depicted, the trench may be located to the side of the waveguide 106, but not through the waveguide 106. In a different embodiment, the trench 406 may be formed by drilling through the oxide layer 102 (in which case the resist layer 402 may be omitted). In phase 4D, the undercut 108 is formed by applying an anisotropic etch through the trench 406, where the etch may remove material of the substrate at a much higher rate in the lateral direction than in the vertical direction such that a long, shallow undercut is formed (the anisotropic etch may selectively etch through the substrate 104, but not the oxide 102). The undercut may be beneath at least a portion of the waveguide 106 and beneath the oxide layer 102. The etch may also remove the resist layer 402.

In phase 4E, additional oxide or other filler material may be deposited to fill in the trench 406 and seal off the undercut 108 (which may comprise an air gap). In another embodiment, the undercut 108 may be filled with a different material, e.g., a material with a lower refractive index than the substrate 104 (e.g., the undercut 108 may be filled with such material after etching or forming the undercut in any suitable manner). Subsequent processing steps for the device may include, e.g., forming additional layers over the oxide layer 102, including circuit elements, optical elements, or other features. In other embodiments, the undercut 108 may be formed in any other suitable manner.

Figure 5:
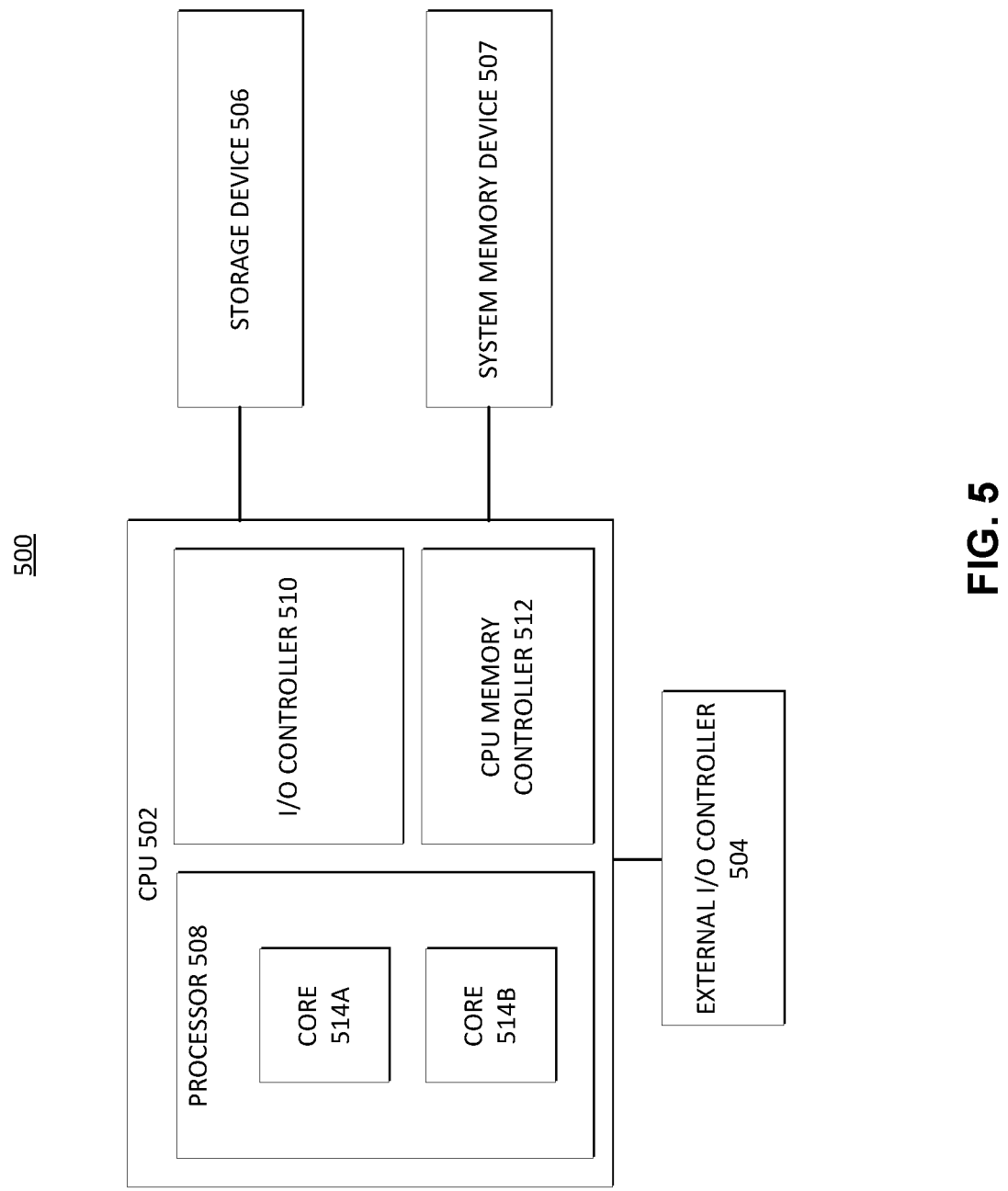
FIG. 5 illustrates an example computer system in accordance with certain embodiments.
Figure 6:
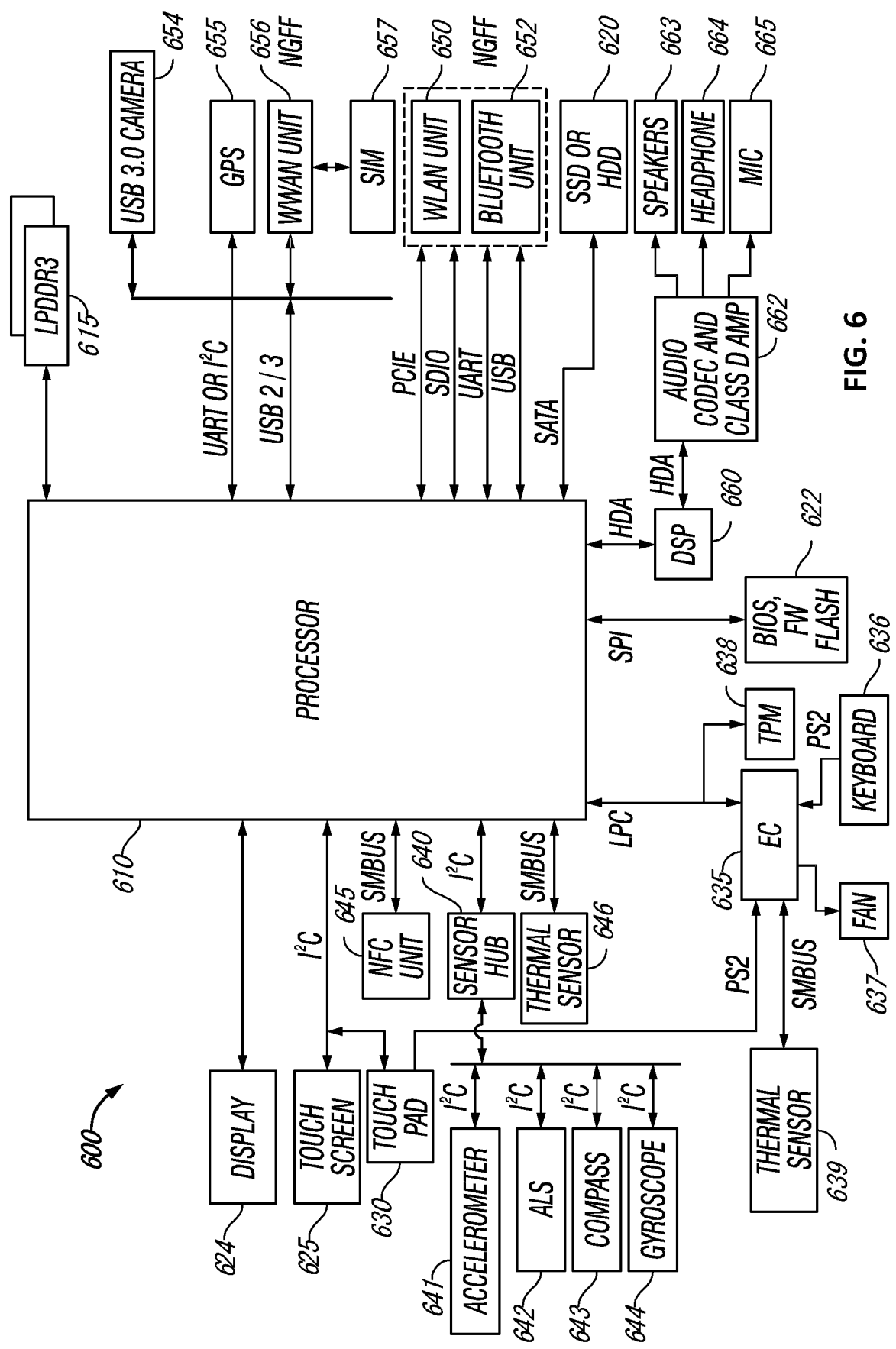
FIG. 6 illustrates a block diagram of components present in a computing system in accordance with various embodiments.
Figure 7:
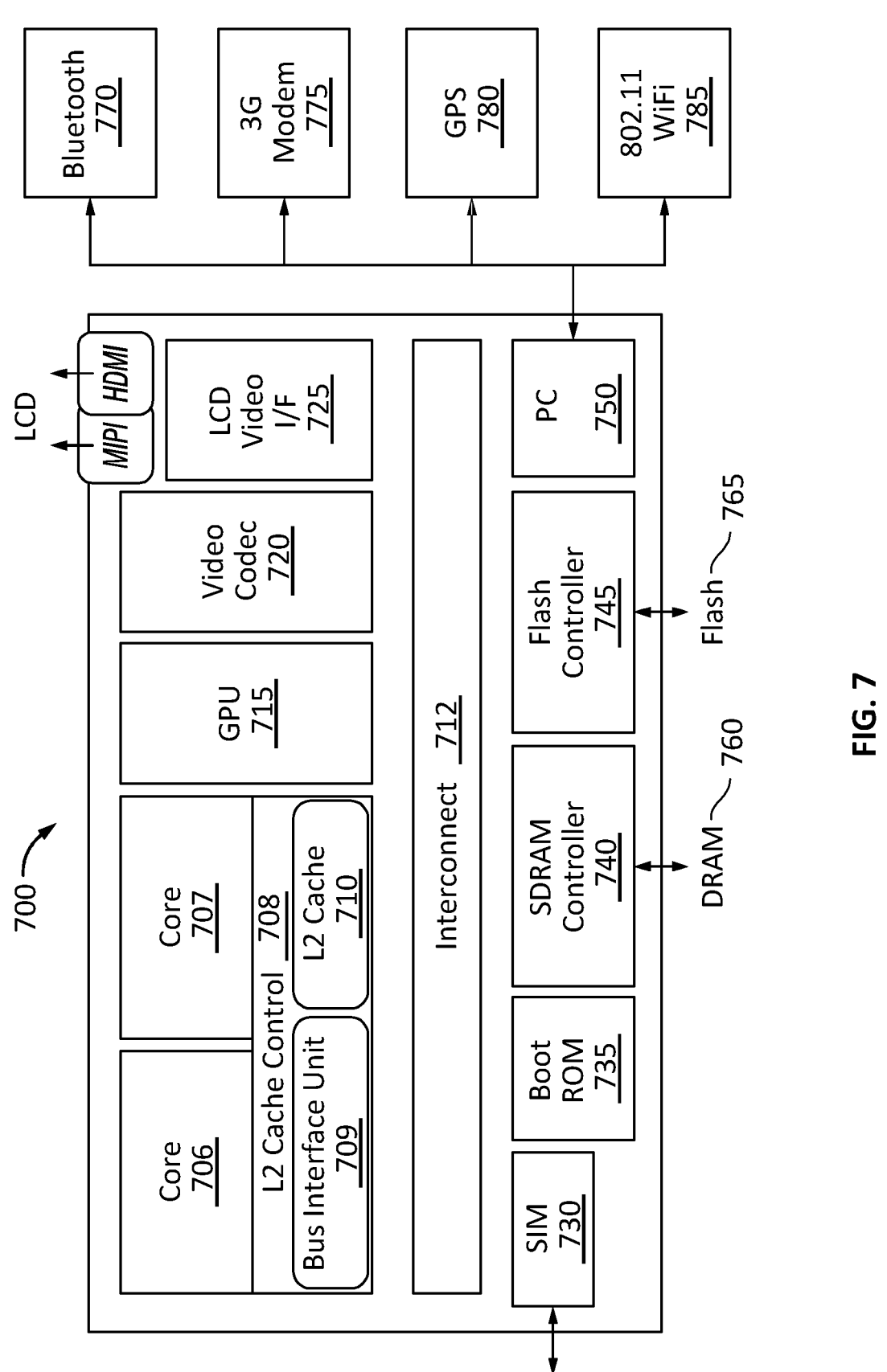
FIG. 7 illustrates a block diagram of another computing system in accordance with various embodiments.

FIGS. 5-7 depict example systems in which various embodiments described herein may be implemented. For example, any of the systems depicted (or one or more components thereof) may include or be coupled to device 100.

FIG. 5 illustrates components of a computer system 500 in accordance with certain embodiments. System 500 includes a central processing unit (CPU) 502 coupled to an external input/output (I/O) controller 504, a storage device 506 such as a solid state drive (SSD) or a dual inline memory module (DIMM), and system memory device 507. During operation, data may be transferred between a storage device 506 and/or system memory device 507 and the CPU 502. In various embodiments, particular memory access operations (e.g., read and write operations) involving a storage device 506 or system memory device 507 may be issued by an operating system and/or other software applications executed by processor 508.

CPU 502 comprises a processor 508, such as a microprocessor, an embedded processor, a digital signal processor (DSP), a network processor, a handheld processor, an application processor, a co-processor, an SOC, or other device to execute code (e.g., software instructions). Processor 508, in the depicted embodiment, includes two processing elements (cores 514A and 514B in the depicted embodiment), which may include asymmetric processing elements or symmetric processing elements. However, a processor may include any number of processing elements that may be symmetric or asymmetric. CPU 502 may be referred to herein as a host computing device (though a host computing device may be any suitable computing device operable to issue memory access commands to a storage device 506).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 514 (e.g., 514A or 514B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

In some embodiments, processor 508 may comprise a processor unit, such as a processor core, graphics processing unit, hardware accelerator, field programmable gate array, neural network processing unit, artificial intelligence processing unit, inference engine, data processing unit, or infrastructure processing unit.

I/O controller 510 is an integrated I/O controller that includes logic for communicating data between CPU 502 and I/O devices. In other embodiments, the I/O controller 510 may be on a different chip from the CPU 502. I/O devices may refer to any suitable devices capable of transferring data to and/or receiving data from an electronic system, such as CPU 502. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device. In a particular embodiment, an I/O device may comprise a storage device 506 coupled to the CPU 502 through I/O controller 510.

An I/O device may communicate with the I/O controller 510 of the CPU 502 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 510 and an associated I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller 510 may be located off-chip (e.g., not on the same chip as CPU 502) or may be integrated on the same chip as the CPU 502.

CPU memory controller 512 is an integrated memory controller that controls the flow of data going to and from one or more system memory devices 507. CPU memory controller 512 may include logic operable to read from a system memory device 507, write to a system memory device 507, or to request other operations from a system memory device 507. In various embodiments, CPU memory controller 512 may receive write requests from cores 514 and/or I/O controller 510 and may provide data specified in these requests to a system memory device 507 for storage therein. CPU memory controller 512 may also read data from a system memory device 507 and provide the read data to I/O controller 510 or a core 514. During operation, CPU memory controller 512 may issue commands including one or more addresses of the system memory device 507 in order to read data from or write data to memory (or to perform other operations). In some embodiments, CPU memory controller 512 may be implemented on the same chip as CPU 502, whereas in other embodiments, CPU memory controller 512 may be implemented on a different chip than that of CPU 502. I/O controller 510 may perform similar operations with respect to one or more storage devices 506.

The CPU 502 may also be coupled to one or more other I/O devices through external I/O controller 504. In a particular embodiment, external I/O controller 504 may couple a storage device 506 to the CPU 502. External I/O controller 504 may include logic to manage the flow of data between one or more CPUs 502 and I/O devices. In particular embodiments, external I/O controller 504 is located on a motherboard along with the CPU 502. The external I/O controller 504 may exchange information with components of CPU 502 using point-to-point or other interfaces.

A system memory device 507 may store any suitable data, such as data used by processor 508 to provide the functionality of computer system 500. For example, data associated with programs that are executed or files accessed by cores 514 may be stored in system memory device 507. Thus, a system memory device 507 may include a system memory that stores data and/or sequences of instructions that are executed or otherwise used by the cores 514. In various embodiments, a system memory device 507 may store temporary data, persistent data (e.g., a user's files or instruction sequences) that maintains its state even after power to the system memory device 507 is removed, or a combination thereof. A system memory device 507 may be dedicated to a particular CPU 502 or shared with other devices (e.g., one or more other processors or other devices) of computer system 500.

In various embodiments, a system memory device 507 may include a memory comprising any number of memory partitions, a memory device controller, and other supporting logic (not shown). A memory partition may include non-volatile memory and/or volatile memory.

Non-volatile memory is a storage medium that does not require power to maintain the state of data stored by the medium, thus non-volatile memory may have a determinate state even if power is interrupted to the device housing the memory. Nonlimiting examples of nonvolatile memory may include any or a combination of: 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium (thus volatile memory is memory whose state (and therefore the data stored on it) is indeterminate if power is interrupted to the device housing the memory). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

A storage device 506 may store any suitable data, such as data used by processor 508 to provide functionality of computer system 500. For example, data associated with programs that are executed or files accessed by cores 514A and 514B may be stored in storage device 506. Thus, in some embodiments, a storage device 506 may store data and/or sequences of instructions that are executed or otherwise used by the cores 514A and 514B. In various embodiments, a storage device 506 may store persistent data (e.g., a user's files or software application code) that maintains its state even after power to the storage device 506 is removed. A storage device 506 may be dedicated to CPU 502 or shared with other devices (e.g., another CPU or other device) of computer system 500.

In various embodiments, storage device 506 may comprise a disk drive (e.g., a solid state drive); a memory card; a Universal Serial Bus (USB) drive; a Dual In-line Memory Module (DIMM), such as a Non-Volatile DIMM (NVDIMM); storage integrated within a device such as a smartphone, camera, or media player; or other suitable mass storage device.

In a particular embodiment, a semiconductor chip may be embodied in a semiconductor package. In various embodiments, a semiconductor package may comprise a casing comprising one or more semiconductor chips (also referred to as dies). A package may also comprise contact pins or leads used to connect to external circuits.

In some embodiments, all or some of the elements of system 500 are resident on (or coupled to) the same circuit board (e.g., a motherboard). In various embodiments, any suitable partitioning between the elements may exist. For example, the elements depicted in CPU 502 may be located on a single die (e.g., on-chip) or package or any of the elements of CPU 502 may be located off-chip or off-package. Similarly, the elements depicted in storage device 506 may be located on a single chip or on multiple chips. In various embodiments, a storage device 506 and a computing host (e.g., CPU 502) may be located on the same circuit board or on the same device and in other embodiments the storage device 506 and the computing host may be located on different circuit boards or devices.

The components of system 500 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 500, such as cores 514, one or more CPU memory controllers 512, I/O controller 510, integrated I/O devices, direct memory access (DMA) logic (not shown), etc. In various embodiments, components of computer system 500 may be coupled together through one or more networks comprising any number of intervening network nodes, such as routers, switches, or other computing devices. For example, a computing host (e.g., CPU 502) and the storage device 506 may be communicably coupled through a network.

Although not depicted, system 500 may use a battery and/or power supply outlet connector and associated system to receive power, a display to output data provided by CPU 502, or a network interface allowing the CPU 502 to communicate over a network. In various embodiments, the battery, power supply outlet connector, display, and/or network interface may be communicatively coupled to CPU 502. Other sources of power can be used such as renewable energy (e.g., solar power or motion based power).

Referring now to FIG. 6, a block diagram of components present in a computer system that may function as either a host device or a peripheral device (or which may include both a host device and one or more peripheral devices) in accordance with certain embodiments is described. As shown in FIG. 6, system 600 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 6 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 6, a processor 610, in one embodiment, includes a microprocessor, multi-core processor, multi-threaded processor, an ultra-low voltage processor, an embedded processor, or other known processing element. In the illustrated implementation, processor 610 acts as a main processing unit and central hub for communication with many of the various components of the system 600. As one example, processor 610 is implemented as a system on a chip (SoC). As a specific illustrative example, processor 610 includes an Intel® Architecture Core™-based processor such as an i3, i5, i7 or another such processor available from Intel Corporation, Santa Clara, CA. However, other low power processors such as those available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 610 in one implementation will be discussed further below to provide an illustrative example.

Processor 610, in one embodiment, communicates with a system memory 615. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 620 may also couple to processor 610. In various embodiments, to enable a thinner and lighter system design as well as to improve system responsiveness, this mass storage may be implemented via a SSD. However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 6, a flash device 622 may be coupled to processor 610, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 600. Specifically shown in the embodiment of FIG. 6 is a display 624 which may be a high definition LCD or LED panel configured within a lid portion of the chassis. This display panel may also provide for a touch screen 625, e.g., adapted externally over the display panel such that via a user's interaction with this touch screen, user inputs can be provided to the system to enable desired operations, e.g., with regard to the display of information, accessing of information and so forth. In one embodiment, display 624 may be coupled to processor 610 via a display interconnect that can be implemented as a high performance graphics interconnect. Touch screen 625 may be coupled to processor 610 via another interconnect, which in an embodiment can be an I2C interconnect. As further shown in FIG. 6, in addition to touch screen 625, user input by way of touch can also occur via a touch pad 630 which may be configured within the chassis and may also be coupled to the same I2C interconnect as touch screen 625.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited 10 interference when using multi-touch.

For perceptual computing and other purposes, various sensors may be present within the system and may be coupled to processor 610 in different manners. Certain inertial and environmental sensors may couple to processor 610 through a sensor hub 640, e.g., via an I2C interconnect. In the embodiment shown in FIG. 6, these sensors may include an accelerometer 641, an ambient light sensor (ALS) 642, a compass 643 and a gyroscope 644. Other environmental sensors may include one or more thermal sensors 646 which in some embodiments couple to processor 610 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example, with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

Also seen in FIG. 6, various peripheral devices may couple to processor 610. In the embodiment shown, various components can be coupled through an embedded controller 635. Such components can include a keyboard 636 (e.g., coupled via a PS2 interface), a fan 637, and a thermal sensor 639. In some embodiments, touch pad 630 may also couple to EC 635 via a PS2 interface. In addition, a security processor such as a trusted platform module (TPM) 638 in accordance with the Trusted Computing Group (TCG) TPM Specification Version 1.2, dated Oct. 2, 2003, may also couple to processor 610 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.2 Specification (September 2017), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 600 can communicate with external devices in a variety of manners, including wirelessly. In the embodiment shown in FIG. 6, various wireless modules, each of which can correspond to a radio configured for a particular wireless communication protocol, are present. One manner for wireless communication in a short range such as a near field may be via a near field communication (NFC) unit 645 which may communicate, in one embodiment with processor 610 via an SMBus. Note that via this NFC unit 645, devices in close proximity to each other can communicate. For example, a user can enable system 600 to communicate with another portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 6, additional wireless units can include other short range wireless engines including a WLAN unit 650 and a Bluetooth unit 652. Using WLAN unit 650, Wi-Fi™ communications in accordance with a given Institute of Electrical and Electronics Engineers (IEEE) 802.11 standard can be realized, while via Bluetooth unit 652, short range communications via a Bluetooth protocol can occur. These units may communicate with processor 610 via, e.g., a USB link or a universal asynchronous receiver transmitter (UART) link. Or these units may couple to processor 610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 656 which in turn may couple to a subscriber identity module (SIM) 657. In addition, to enable receipt and use of location information, a GPS module 655 may also be present. Note that in the embodiment shown in FIG. 6, WWAN unit 656 and an integrated capture device such as a camera module 654 may communicate via a given USB protocol such as a USB 2.0 or 3.0 link, or a UART or I2C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter).

An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 660, which may couple to processor 610 via a high definition audio (HDA) link. Similarly, DSP 660 may communicate with an integrated coder/decoder (CODEC) and amplifier 662 that in turn may couple to output speakers 663 which may be implemented within the chassis. Similarly, amplifier and CODEC 662 can be coupled to receive audio inputs from a microphone 665 which in an embodiment can be implemented via dual array microphones (such as a digital microphone array) to provide for high quality audio inputs to enable voice-activated control of various operations within the system. Note also that audio outputs can be provided from amplifier/CODEC 662 to a headphone jack 664. Although shown with these particular components in the embodiment of FIG. 6, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 610 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TxT), and Intel® Manageability Engine Technology along with secure user interfaces such as a secure keyboard and display.

Turning next to FIG. 7, another block diagram for an example computing system that may serve as a host device or peripheral device (or may include both a host device and one or more peripheral devices) in accordance with certain embodiments is shown. As a specific illustrative example, SoC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 700 includes 2 cores—706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 712 includes an on-chip interconnect, such as an IOSF, AMBA, or other interconnect discussed above, which potentially implements one or more aspects of the described disclosure.

Interconnect 712 provides communication channels to the other components, such as a Subscriber Identity Module (SIM) 730 to interface with a SIM card, a boot rom 735 to hold boot code for execution by cores 706 and 707 to initialize and boot SoC 700, a SDRAM controller 740 to interface with external memory (e.g. DRAM 760), a flash controller 745 to interface with non-volatile memory (e.g. Flash 765), a peripheral control 750 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein.

In addition, the system illustrates peripherals for communication, such as a Bluetooth module 770, 3G modem 775, GPS 780, and WiFi 785. Note as stated above, a UE includes a radio for communication. As a result, these peripheral communication modules are not all required. However, in a UE some form of a radio for external communication is to be included.

Although the drawings depict particular computer systems, the concepts of various embodiments are applicable to any suitable integrated circuits and other logic devices. Examples of devices in which teachings of the present disclosure may be used include desktop computer systems, server computer systems, storage systems, handheld devices, tablets, other thin notebooks, systems on a chip (SOC) devices, and embedded applications. Some examples of handheld devices include cellular phones, digital cameras, media players, personal digital assistants (PDAs), and hand-held PCs. Embedded applications may include, e.g., a microcontroller, a digital signal processor (DSP), an SOC, a network computer (NetPC), a set-top box, a network hub, a wide area network (WAN) switch, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising a group of computing devices.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGs. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components of the FIGs., subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 includes an apparatus comprising a substrate; a waveguide above the substrate; and an undercut into the substrate, the undercut beneath at least a portion of the waveguide, wherein a magnitude of a maximum length of the undercut is lower than a magnitude of a maximum depth of the undercut.

Example 2 includes the subject matter of Example 1, and wherein the waveguide comprises silicon nitride ($Si_3N_4$).

Example 3 includes the subject matter of any of Examples 1 and 2, and further including on oxide layer on top of the substrate, wherein the oxide layer surrounds the waveguide.

Example 4 includes the subject matter of any of Examples 1-3, and further including a second waveguide to transfer light to the waveguide, wherein the oxide layer surrounds the second waveguide.

Example 5 includes the subject matter of any of Examples 1-4, and wherein the second waveguide comprises silicon.

Example 6 includes the subject matter of any of Examples 1-5, and wherein the waveguide implements at least a portion of an optical demultiplexer.

Example 7 includes the subject matter of any of Examples 1-6, and wherein the magnitude of the maximum depth of the undercut is less than 5 microns.

Example 8 includes the subject matter of any of Examples 1-7, and wherein the magnitude of the maximum length of the undercut is greater than 80 micrometers.

Example 9 includes the subject matter of any of Examples 1-8, and wherein the magnitude of the maximum length of the undercut is more than five times the magnitude of the maximum depth of the undercut.

Example 10 includes a system comprising a semiconductor chip comprising a substrate; a waveguide above the substrate; and an undercut into the substrate, the undercut beneath at least a portion of the waveguide, wherein a magnitude of a maximum length of the undercut is lower than a magnitude of a maximum depth of the undercut.

Example 11 includes the subject matter of Example 10, and wherein the semiconductor chip comprises an optical transceiver comprising an optical transmitter comprising a plurality of integrated lasers and an optical receiver comprising a demultiplexer comprising the waveguide.

Example 12 includes the subject matter of any of Examples 10 and 11, and wherein the system further comprises a processor.

Example 13 includes the subject matter of any of Examples 10-12, and wherein the system comprising a second semiconductor chip coupled to the first semiconductor chip, the second semiconductor chip comprising the processor.

Example 14 includes the subject matter of any of Examples 10-13, and further including a battery communicatively coupled to the processor, a display communicatively coupled to the processor, or a network interface communicatively coupled to the processor.

Example 15 includes the subject matter of any of Examples 10-14, and wherein the waveguide comprises silicon nitride ($Si_3N_4$).

Example 16 includes the subject matter of any of Examples 10-15, and further including on oxide layer on top of the substrate, wherein the oxide layer surrounds the waveguide.

Example 17 includes the subject matter of any of Examples 10-16, and further including a second waveguide to transfer light to the waveguide, wherein the oxide layer surrounds the second waveguide.

Example 18 includes the subject matter of any of Examples 10-17, and wherein the second waveguide comprises silicon.

Example 19 includes the subject matter of any of Examples 10-18, and wherein the waveguide implements at least a portion of an optical demultiplexer.

Example 20 includes the subject matter of any of Examples 10-19, and wherein the magnitude of the maximum depth of the undercut is less than 5 microns.

Example 21 includes the subject matter of any of Examples 10-20, and wherein the magnitude of the maximum length of the undercut is greater than 80 micrometers.

Example 22 includes the subject matter of any of Examples 10-21, and wherein the magnitude of the maximum length of the undercut is more than five times the magnitude of the maximum depth of the undercut.

Example 23 includes a method comprising forming a substrate; forming a waveguide above the substrate; and forming an undercut into the substrate beneath at least a portion of the waveguide, wherein a magnitude of a maximum length of the undercut is lower than a magnitude of a maximum depth of the undercut.

Example 24 includes the subject matter of Example 23, and wherein forming the undercut comprises applying an anisotropic etch to the substrate.

Example 25 includes the subject matter of any of Examples 23 and 24, and further including forming an oxide layer above the substrate.

Example 26 includes the subject matter of any of Examples 23-25, and wherein forming the undercut comprises forming a trench in the oxide layer to the top of the substrate.

Example 27 includes the subject matter of any of Examples 23-26, and wherein forming the trench comprises drilling through the oxide layer.

Example 28 includes the subject matter of any of Examples 23-27, and wherein forming the trench comprises applying a resist layer over the oxide and etching through an aperture in the resist layer.

Example 29 includes the subject matter of any of Examples 23-28, and wherein the waveguide comprises silicon nitride ($Si_3N_4$).

Example 30 includes the subject matter of any of Examples 23-29, and further including on oxide layer on top of the substrate, wherein the oxide layer surrounds the waveguide.

Example 31 includes the subject matter of any of Examples 23-30, and further including a second waveguide to transfer light to the waveguide, wherein the oxide layer surrounds the second waveguide.

Example 32 includes the subject matter of any of Examples 23-31, and wherein the second waveguide comprises silicon.

Example 33 includes the subject matter of any of Examples 23-32, and wherein the waveguide implements at least a portion of an optical demultiplexer.

Example 34 includes the subject matter of any of Examples 23-33, and wherein the magnitude of the maximum depth of the undercut is less than 5 microns.

Example 35 includes the subject matter of any of Examples 23-34, and wherein the magnitude of the maximum length of the undercut is greater than 80 micrometers.

Example 36 includes the subject matter of any of Examples 23-35, and wherein the magnitude of the maximum length of the undercut is more than five times the magnitude of the maximum depth of the undercut.

What is claimed is:

1. An apparatus comprising:
a substrate;
a waveguide above the substrate;
an undercut into the substrate, the undercut beneath at least a portion of the waveguide, wherein a magnitude of a maximum length of the undercut is higher than a magnitude of a maximum depth of the undercut, wherein the magnitude of the maximum depth of the undercut is less than 5 microns; and
an oxide layer on top of the substrate, wherein the oxide layer surrounds the waveguide.

2. The apparatus of claim 1, wherein the waveguide comprises silicon nitride ($Si_3N_4$).

3. The apparatus of claim 1, the waveguide comprising a core material and a cladding material, wherein the cladding material is an electrically insulating material that surrounds at least a portion of the core material.

4. The apparatus of claim 1, further comprising a second waveguide to transfer light to the waveguide, wherein the second waveguide is on a slab comprising silicon, the slab formed above the substrate, the second waveguide and the slab surrounded by the oxide layer.

5. The apparatus of claim 1, wherein the undercut comprises a material other than air, the material having a lower refractive index than the substrate.

6. The apparatus of claim 1, further comprising a plurality of metal-oxide semiconductor field-effect transistors formed over the oxide layer.

7. The apparatus of claim 1, wherein the oxide layer seals off an air gap of the undercut.

8. The apparatus of claim 1, wherein the magnitude of the maximum length of the undercut is more than five times the magnitude of the maximum depth of the undercut.

9. The apparatus of claim 1, further comprising a second waveguide above the substrate, wherein the oxide layer is in contact with the second waveguide.

10. The apparatus of claim 9, wherein the second waveguide has a higher effective index than the waveguide.

11. The apparatus of claim 1, wherein the waveguide has a lower effective index than a refractive index of the substrate.

12. The apparatus of claim 1, wherein the oxide layer on top of the substrate and surrounding the waveguide comprises silicon dioxide.

13. A system comprising:
a semiconductor die comprising:
a substrate comprising silicon;
a waveguide above the substrate;
an undercut into the substrate, the undercut beneath at least a portion of the waveguide, wherein a magnitude of a maximum length of the undercut is higher than a magnitude of a maximum depth of the undercut;
an oxide layer comprising silicon dioxide, the oxide layer on top of the substrate, wherein the oxide layer surrounds the waveguide; and
a second waveguide above the substrate, wherein the oxide layer is in contact with the second waveguide.

14. The system of claim 13, wherein the semiconductor die comprises an optical transceiver comprising an optical transmitter comprising a plurality of integrated lasers and an optical receiver comprising a demultiplexer comprising the waveguide.

15. The system of claim 13, wherein the system further comprises a processor.

16. The system of claim 15, wherein the system further comprises a second semiconductor die coupled to the semiconductor die, the second semiconductor die comprising the processor.

17. The system of claim 15, further comprising a battery communicatively coupled to the processor, a display communicatively coupled to the processor, or a network interface communicatively coupled to the processor.

18. A method comprising:
forming a waveguide above a substrate comprising silicon;
forming an undercut into the substrate beneath at least a portion of the waveguide, wherein a magnitude of a maximum length of the undercut is higher than a magnitude of a maximum depth of the undercut;
forming an oxide layer comprising silicon dioxide on top of the substrate, wherein the oxide layer surrounds the waveguide; and
forming a second waveguide above the substrate, wherein the oxide layer is in contact with the second waveguide.

19. The method of claim 18, wherein forming the undercut comprises applying an anisotropic etch to the substrate.

* * * * *